(12) United States Patent
Byron et al.

(10) Patent No.: US 10,373,522 B2
(45) Date of Patent: Aug. 6, 2019

(54) GENERATIVE GROUP-BASED MEAL PLANNING SYSTEM AND METHOD

(71) Applicant: International Business Machines Corporation, Armonk, NY (US)

(72) Inventors: Donna K. Byron, Petersham, MA (US); Carmine M. DiMascio, West Roxbury, MA (US); Florian Pinel, New York, NY (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 14/988,357

(22) Filed: Jan. 5, 2016

(65) Prior Publication Data

US 2017/0193853 A1 Jul. 6, 2017

(51) Int. Cl.
*G09B 19/00* (2006.01)
*G06N 20/00* (2019.01)

(52) U.S. Cl.
CPC ......... *G09B 19/0092* (2013.01); *G06N 20/00* (2019.01)

(58) Field of Classification Search
CPC ............... G06Q 30/02; G06Q 30/0633; G06F 19/3475; Y10S 128/921
USPC ....................................................... 434/127
See application file for complete search history.

(56) References Cited

U.S. PATENT DOCUMENTS

| 6,872,077 B2 | 3/2005 | Yeager | |
| 2002/0120534 A1* | 8/2002 | Howard | G06Q 10/087 705/28 |
| 2005/0193901 A1* | 9/2005 | Buehler | A47J 44/00 99/468 |

(Continued)

FOREIGN PATENT DOCUMENTS

CN 103577671 A 2/2014

OTHER PUBLICATIONS

Mitchell, Melanie; An Introduction to Genetic Algorithms; reprint, MIT Press, 1998. <https://books.google.com/books?id=0eznlz0TF-IC&lpg=PP1&dq=genetic%20algorithm&pg=PA8#v=onepage&q=fitness&f=false>.*

(Continued)

*Primary Examiner* — Samchuan C Yao
*Assistant Examiner* — Michael C Humphrey
(74) *Attorney, Agent, or Firm* — Pepper Hamilton LLP

(57) ABSTRACT

Embodiments provide a generative group-based meal planning system and method for the creation of candidate meal plans based upon a pre-selected list of ingredients. The meal planning system can create parent meal plans based upon one or more recipes having one or more of the pre-selected ingredients. Child meal plans can be created by the random crossing of the recipes contained in the parent meal plans. The child meal plans can be scored against a genetic algorithm, such as a fitness function, which takes into consideration cost of ingredients, waste, flavor compatibility, preparation time, and ingredient shelf life. The meal planning system can utilize a cognitive system with natural language processing abilities to generate new recipes based off of waste or flavor compatibility. The child meal plans having the highest fitness score can be used as the parent meal plans in the next iteration of analysis. After a pre- (Continued)

determined number of iterations, a candidate meal plan can be output by the system.

19 Claims, 9 Drawing Sheets

(56) References Cited

U.S. PATENT DOCUMENTS

| | | | |
|---|---|---|---|
| 2009/0144081 A1* | 6/2009 | Harlan | G06Q 10/10 705/2 |
| 2010/0094475 A1* | 4/2010 | Masters | G06F 1/26 700/292 |
| 2012/0260683 A1* | 10/2012 | Cheon | F25D 29/00 62/125 |
| 2012/0322032 A1 | 12/2012 | Smith | |
| 2013/0138656 A1* | 5/2013 | Wheaton | G06F 17/30705 707/740 |
| 2013/0224694 A1 | 8/2013 | Moore et al. | |
| 2013/0262995 A1 | 10/2013 | Howell | |
| 2014/0006131 A1* | 1/2014 | Causey | G06Q 10/0875 705/14.24 |
| 2014/0095479 A1* | 4/2014 | Chang | G06F 17/30699 707/722 |
| 2014/0252091 A1* | 9/2014 | Morse | F25D 29/00 235/385 |
| 2014/0297738 A1* | 10/2014 | King | G09B 19/0092 709/204 |
| 2015/0079551 A1 | 3/2015 | Egan | |
| 2015/0149298 A1* | 5/2015 | Tapley | G06Q 30/0633 705/14.66 |
| 2015/0186836 A1* | 7/2015 | Chouhan | G06Q 10/087 705/28 |
| 2015/0294451 A1* | 10/2015 | Lee | F25D 29/00 382/110 |
| 2015/0312348 A1* | 10/2015 | Lustgarten | H04L 67/12 705/14.66 |
| 2017/0193853 A1* | 7/2017 | Byron | G09B 19/0092 |

OTHER PUBLICATIONS

YouTube video: Ratatouille—Remy experiencing food as colour, shape and sou[nd]; uploaded by Graham Harper, Dec. 2009. <https://youtu.be/VXoJjgxMj9M>.*

* cited by examiner

GENERATIVE GROUP-BASED MEAL PLANNING SYSTEM AND METHOD

TECHNICAL FIELD

The present application relates generally to a system that can be used to plan meals based on a variety of user preferences and external variables.

BACKGROUND

Planning each meal for an entire week can be a continuous challenge for a family, particularly when several members of the family have dietary constraints such as food allergies. Trying to take into account these restrictions, along with purchasing the right quantities of food so that one is not left with excessive leftovers or is not required to constantly make back and forth trips to the grocery store, is a daunting challenge that is faced by most families on a weekly basis.

Recently, International Business Machines (IBM) Corporation of Armonk, N.Y., has released an intelligent cooking recipe application referred to as IBM Chef Watson™. IBM Chef Watson™ searches for patterns in existing recipes and combines them with an extensive database of scientific (e.g., molecular underpinnings of flavor compounds) and cooking related information (e.g., what ingredients go into different dishes) with regard to food pairings to generate ideas for unexpected combinations of ingredients. In processing the database, IBM Chef Watson™ learns how specific cuisines favor certain ingredients and what ingredients traditionally go together, such as tomatoes and basil. The application allows a user to identify ingredients that the user wishes to include in the recipe, ingredients that the user wishes to exclude, as well as specify the meal time (breakfast, lunch, dinner), course (appetizer, main. dessert), and the like.

SUMMARY

Embodiments can provide a computer implemented method in a data processing system comprising a processor and a memory which can comprising instructions which are executed by the processor to cause the processor to implement a generative group-based meal planning system, and can comprise the steps of receiving, by the meal planning system, a request to generate a candidate meal plan, wherein one or more ingredients are identified to be incorporated into one or more recipes contained in the candidate meal plan, wherein the number of needed recipes to be included in the candidate meal plan is pre-determined; importing, by the meal planning system, one or more recipes incorporating the one or more identified ingredients; generating, by the meal planning system, one or more parent meal plans containing the pre-determined number of recipes, wherein the parent meal plan recipes are randomly selected from the imported recipes incorporating the one or more identified ingredients; generating, by the meal planning system, one or more child meal plans, wherein the child meal plan recipes are selected through the random crossing of recipes between the one or more parent meal plans; determining, by the meal planning system, a fitness score for the one or more child meal plans through the utilization of a genetic algorithm; wherein the steps of generating one or more parent meal plans, generating one or more child meal plans, and determining the fitness score for the one or more child meal plans are repeated for a pre-determined amount of iterations, wherein the one or more child meal plans with the highest fitness scores are used as the next generation of one or more parent meal plans; and outputting, by the meal planning system, the candidate meal plan having the pre-determined number of recipes, wherein the candidate meal plan is selected from the child meal plan having the highest fitness score.

Embodiments can further provide a method wherein in addition to identifying one or more ingredients to be incorporated, one or more ingredients to be excluded from the one or more recipes contained in the candidate meal plan are further identified.

Embodiments can further provide a method wherein the genetic algorithm comprises a fitness function that considers cost of ingredients, shelf life of ingredients, flavor compatibility of ingredients, waste, and preparation time as factors in determining the fitness score.

Embodiments can further provide a method wherein the meal planning system is connected to a database containing cost of ingredient information, a database containing shelf life of ingredient information, or a database containing flavor compatibility of information.

Embodiments can further provide a method wherein the meal planning system comprises a cognitive system having natural language processing capabilities.

Embodiments can further provide a method comprising the steps of caching, through the meal planning system, waste ingredients in one or more recipes identified during the determination of the fitness score; creating, through the cognitive system, one or more new recipes based upon the waste ingredients cached; and incorporating, by the meal planning system, the one or more new recipes based upon the waste ingredients into the next generation of one or more parent meal plans.

Embodiments can further provide a method comprising the steps of identifying, through the cognitive system, one or more identified ingredients as having flavor compatibility; creating, through the cognitive system, one or more new recipes based upon the compatible ingredients; and incorporating, by the meal planning system, the one or more new recipes based upon the compatible ingredients into the first or next generation of one or more parent meal plans.

Embodiments can further provide a method wherein the fitness function is configured to award greater weight to recipes having greater cost efficiency of ingredients, thereby causing the cognitive system to create the one or more new recipes prioritizing cost of ingredients over flavor compatibility.

Embodiments can further provide a method comprising the step of verifying the one or more recipes in the candidate meal plan against shelf life of ingredient information.

Embodiments can further provide a method comprising the step of reorganizing the one or more recipes in the candidate meal plan to maximize the shelf life of the ingredients.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a meal planning processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
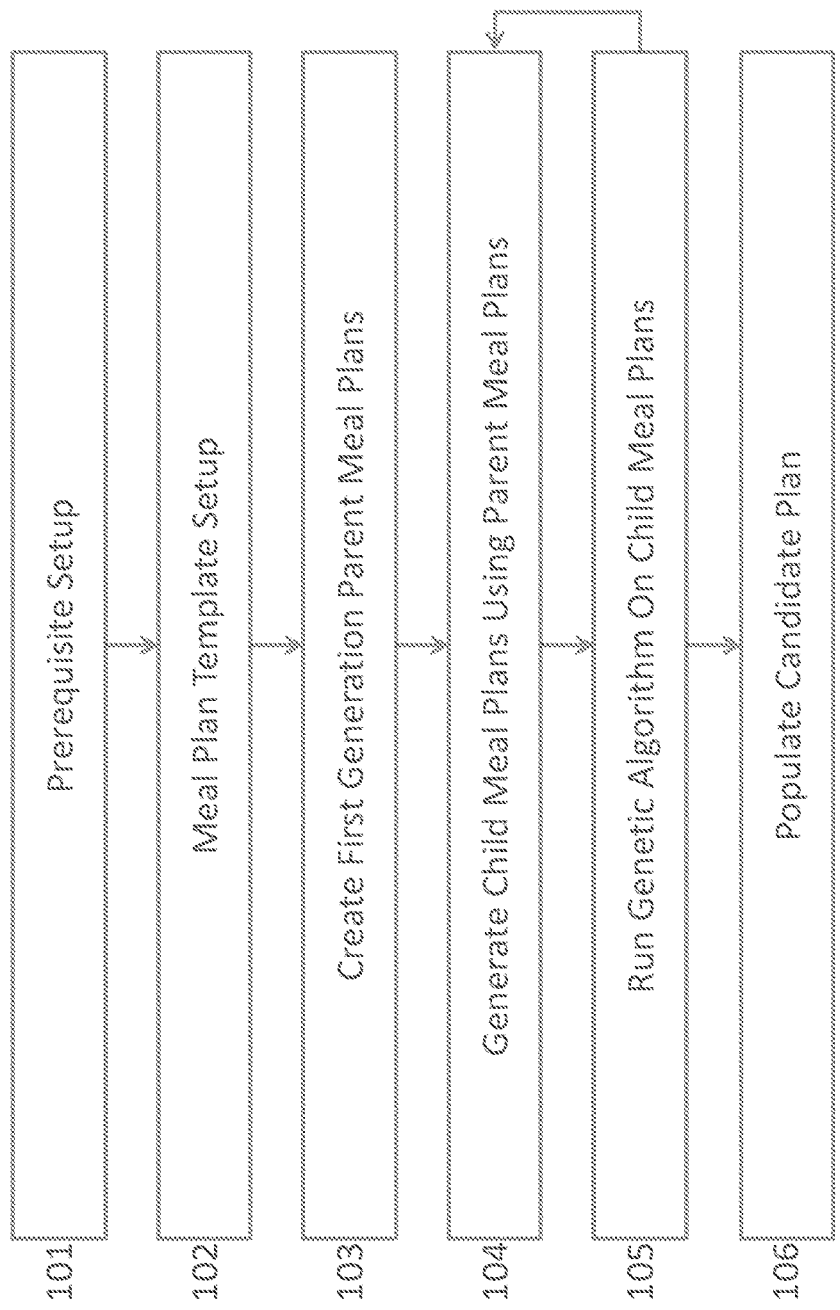
FIG. 1 is a flowchart outlining an example operational flow for a generative group-based meal planning system in accordance with one illustrative embodiment.

As described above, the present system relates to the generation of a fixed number of recipes for a pre-determined time period based upon user preferences and external variables through the use of a recipe generation system, such as IBM Chef Watson™, and a genetic algorithm (or other iterative hill-climbing strategy) to recombine and evaluate candidate meal plans. In an embodiment, the fitness function can take into account variables such as desired leftover amounts, ingredient cost, and/or variety of ingredients in order to generate more comprehensive meal plans than are available from conventional meal planning programs. The flexibility that results from a generative approach using random sampling and iterative improvement, as opposed to simply following a pre-set meal plans, allows for recombination of cross-recipe meal plans in a manner that can improve their overall fitness scores, as well as takes into account ingredient restrictions based upon the inventory offerings of a particular grocery store or ingredient wholesaler.

The present description and claims may make us of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence FIGS. 1-8 illustrate a system and method for generative group-based meal planning 100, according to an embodiment. Planning meals for one or more people over the period of a week can be a weekly challenge facing most households. Considering the ingredients on hand, along with the various dietary restrictions of a large family, can be a daunting and time-consuming task.

The present system, according to an embodiment, can collect user preferences and constraints to generate a fixed number of recipes for a pre-determined time period using a recipe generation system, which can include a cognitive system, such as Chef Watson™, and a genetic algorithm (which can guide a search through a high-dimensional space by applying, for example, a fitness function) to re-combine and evaluate candidate meal plans. In an embodiment, the fitness function can take into account waste amounts, ingredient cost and availability, variety, nutrition, and preparation time, which allows the recombination of candidate meal plans in ways that can improve overall fitness scores. In an embodiment, the meal planning system can interact with a database containing the inventory of a particular grocery store or wholesaler in order to maximize candidate meal plans that utilize ingredients currently in-stock at the particular grocery store or wholesaler.

FIG. 1 is a flowchart outlining an example operational flow for a generative group-based meal planning system 100 in accordance with one illustrative embodiment. The first operation, prerequisite setup 101, can involve several preparatory steps to prime the system 100 for the recipe and meal plan generation process. As a prerequisite, a database of recipes can be pre-classified based on numerous categories, described in greater detail in FIG. 2. The pre-classification can be conducted by the user, by the cognitive system, or can be imported as a complete data set from another external source, such as a database or from the Internet.

Figure 2A:
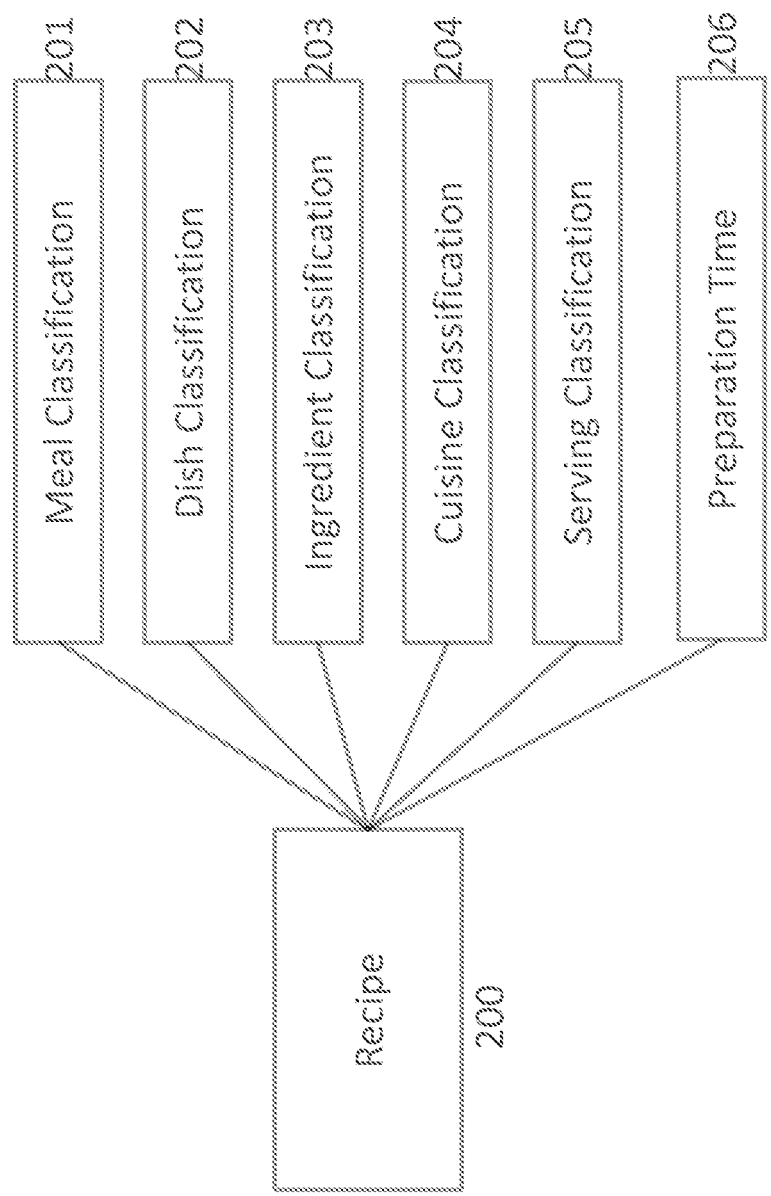
FIG. 2A illustrates an example recipe classification system for use in the meal planning system as illustrated in FIG. 1.

FIG. 2A illustrates an example recipe classification system for use in the meal planning system as illustrated in FIG. 1. According to an embodiment, a recipe 200 can be classified using a variety of criteria. The category of criteria can include, but is not limited to, classification based on meal 201, dish 202, ingredient 203, cuisine 204, serving amount 205, and preparation time 206. Each recipe classification can elect to select one or more options within each category, as many recipes do not fall neatly into a single delineated category. Meal classifications 201 can classify a recipe by the meal time (e.g., breakfast, lunch, dinner, brunch, snack, etc.) when the particular recipe 200 is served. Dish classifications 202 can classify a recipe by the type of dish (e.g., appetizer, entrée, dessert, etc.) the particular recipe represents. Ingredient classifications 203 can deconstruct the recipe 200 into its constituent ingredients and their associated amounts. The deconstruction can occur using the natural language processing abilities of the cognitive system or through manual entry by a user. Cuisine classification 204 can classify the recipe 200 by the traditional locational genre of food typically associated with the recipe 200 (e.g. Italian, Chinese, American, etc.). Serving amount classification 205 can classify the recipe 200 based upon the number of servings an unaltered version of the recipe will produce. The serving size 205 can be measured in terms of persons served, slices, pieces, weight, or other typical food measurement metric known in the art. Additionally, the serving amount classification 205 can store information relating to any excess produced in the recipe (food that is prepared in the course of making the recipe that can be used at a later time). Preparation time classification 206 can be measured in minutes or hours, and can denote the amount of time needed to prepare and produce the dish embodied by the particular recipe 200. Ingredient preparation time and cooking time can be classified as separate values, such that the system 100 can consider shared preparation steps between recipes (e.g., chopping onions for use in one or more dishes) in order to minimize the user time needed to implement the meal plan created using the meal planning system 100. Each classification can be entered by the user, can be imported from an external source such as the Internet or a recipe database, or the cognitive system can parse and classify each recipe using its natural language facilities.

Figure 2B:
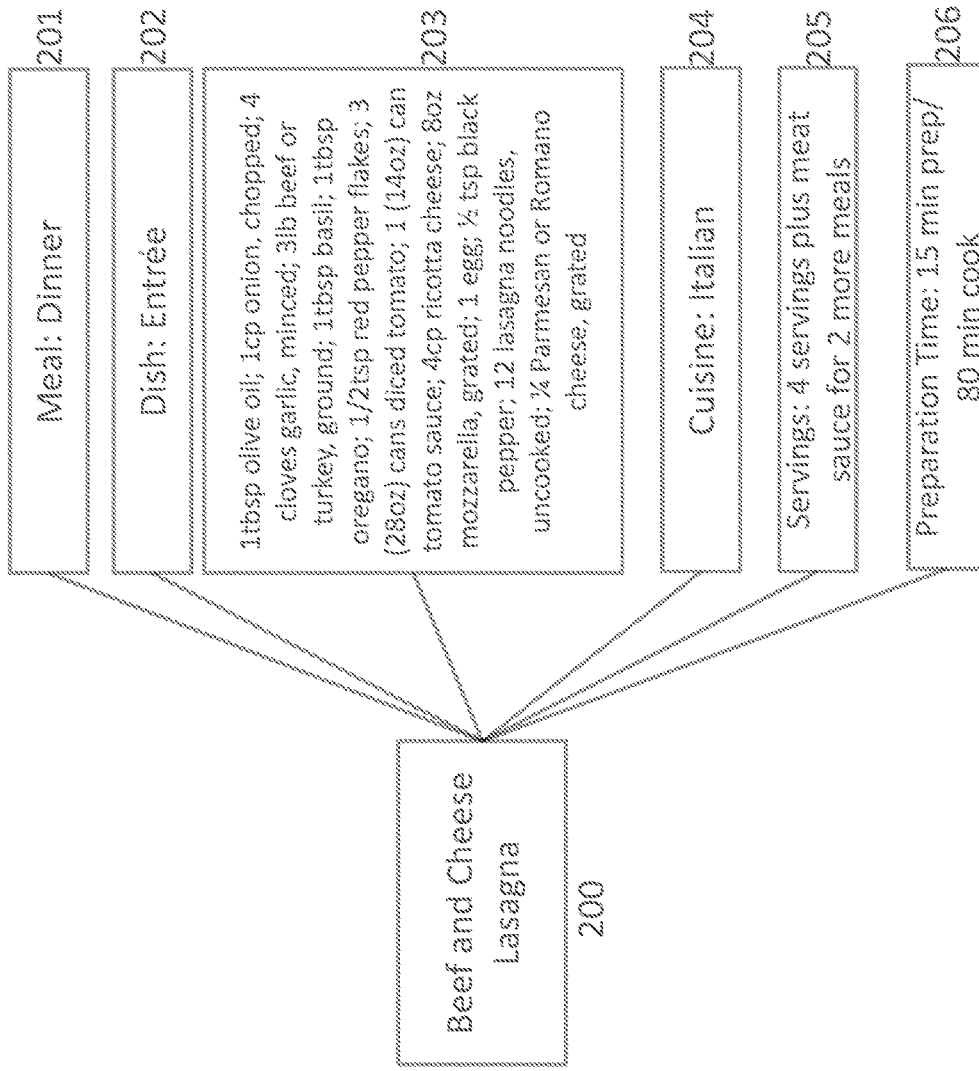
FIG. 2B illustrates a sample recipe classified using the classification system as illustrated in FIG. 2A.

FIG. 2B illustrates a sample recipe 200 classified using the classification system as illustrated in FIG. 2A. In the example, the sample recipe 200 is a recipe for a beef and cheese lasagna. The meal classification 201 can be designated "dinner." The dish classification 202 can be designated "entrée." The ingredient classification 203 lists the variety of ingredients that can make up a beef and cheese lasagna. The cuisine designation 204 can be designated "Italian." The serving amount designation 205 can be designated "4 servings." Additionally, the serving amount designation 205 can include the excess food information taken from the recipe that states that the amount of sauce produced by following the recipe can be enough for two additional meals having the same serving size. Lastly, the preparation time classification 206 can be designated as "fifteen (15) minutes preparation time and eighty (80) minutes cooking time." Alternately, the preparation time classification 206 can be designated as "95 minutes preparation time."

The prerequisite setup operation 101 can include a process to designate an "ingredient space" for the creation of the meal plan. The ingredient space 401 can be determined by excluding a list of ingredients that are not suitable for consumption by the user (or by a person who will be consuming the meals generated by user) from the total list of possible ingredients. An example of an unsuitable ingredient can be an allergen or a distasteful ingredient that the user wishes to avoid. Identification of a recipe having an ingredient that falls outside of the ingredient space 401 can result in the recipe being excluded from the list of possible recipes to be included in the initial generation of parent meal plans. Alternatively, a recipe identified as having an excluded ingredient can be altered by the user or by the cognitive system such that the offending ingredient can be substituted for another similar ingredient that falls within the designated ingredient space 401.

The prerequisite setup operation 101 can create a list of "seed ingredients" that the meal planning system 100 can use as a genesis for creating the first generation of recipes. Embodiments may choose seed ingredients 402 through a variety of methods, including choosing like ingredients from a given recipe, user-selected ingredients, ingredients generated through an inspection of a user's browsing or shopping history, ingredients specified from an inspection of a local grocery's sale or inventory list, or the seed ingredients can be chosen at random by the cognitive system or by the user. Alternatively, the cognitive system or user can designate a seed list based on dish classifications, categories of ingredients, or cuisine classifications, as opposed to the selection of individual ingredients.

Figure 3:
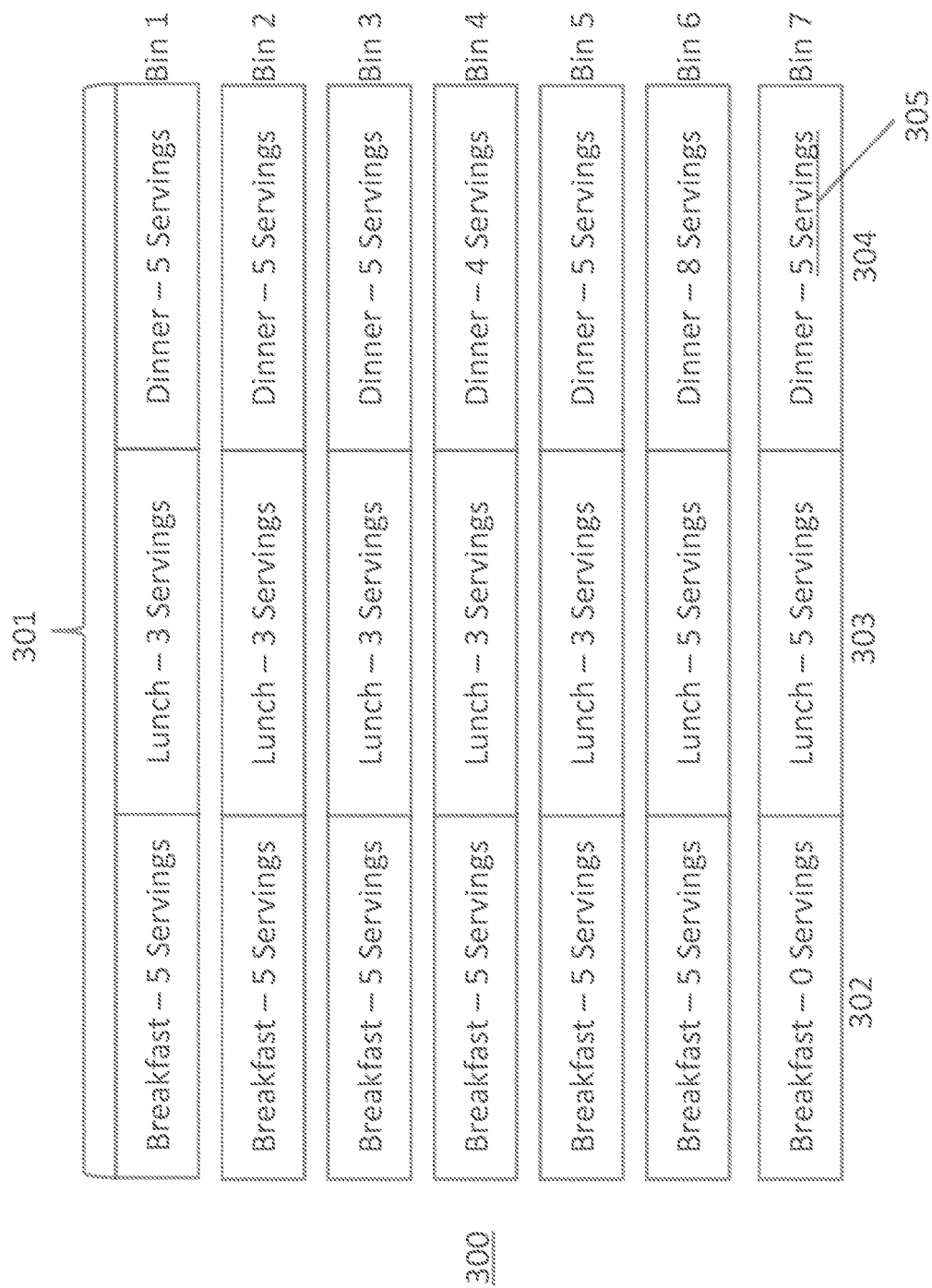
FIG. 3 depicts an example of a meal plan template for the meal planning system depicted in FIG. 1.

The meal planning system 100 can include a meal plan template setup operation 102 in which the meal planning system 100 can create a meal plan template 300 based on the preferences input by the user. FIG. 3 depicts an example of a meal plan template for the meal planning system 100 depicted in FIG. 1. As an example, where the user desires the meal planning system 100 to plan meals for a week's worth of time (twenty one (21) meals), the meal plan template 300 can be assigned seven bins 301 that can correspond to a day of the week. Each bin 301 can be further subdivided into three sections, which can represent breakfast 302, lunch 303, and dinner 304. During the meal plan template setup operation 102, the user can designate the amount of meals needed for each section and/or the amount of meals needed for each bin 301 (day). In an embodiment, the user can additionally input the amount of servings 305 needed for a particular meal. The user can create a meal plan template 300 for the creation of meal plans having more or less than seven days, or for the creation of meal plans that excludes or add one particular meal group. This can result in the removal or additions of one or more bins or sections in the final meal plan template 300.

FIG. 3 shows an example meal plan template 300 for a meal plan that requires recipes for three meals a day for a full seven days. Bins one through seven are created within the system and can have input the amount of servings needed for each meal in the template. As an example, additional servings for Bin 6 Dinner have been input to compensate for dinner guests, while Bin 7 Breakfast has no servings to designate that the system should exclude that meal from its calculations.

Figure 4:
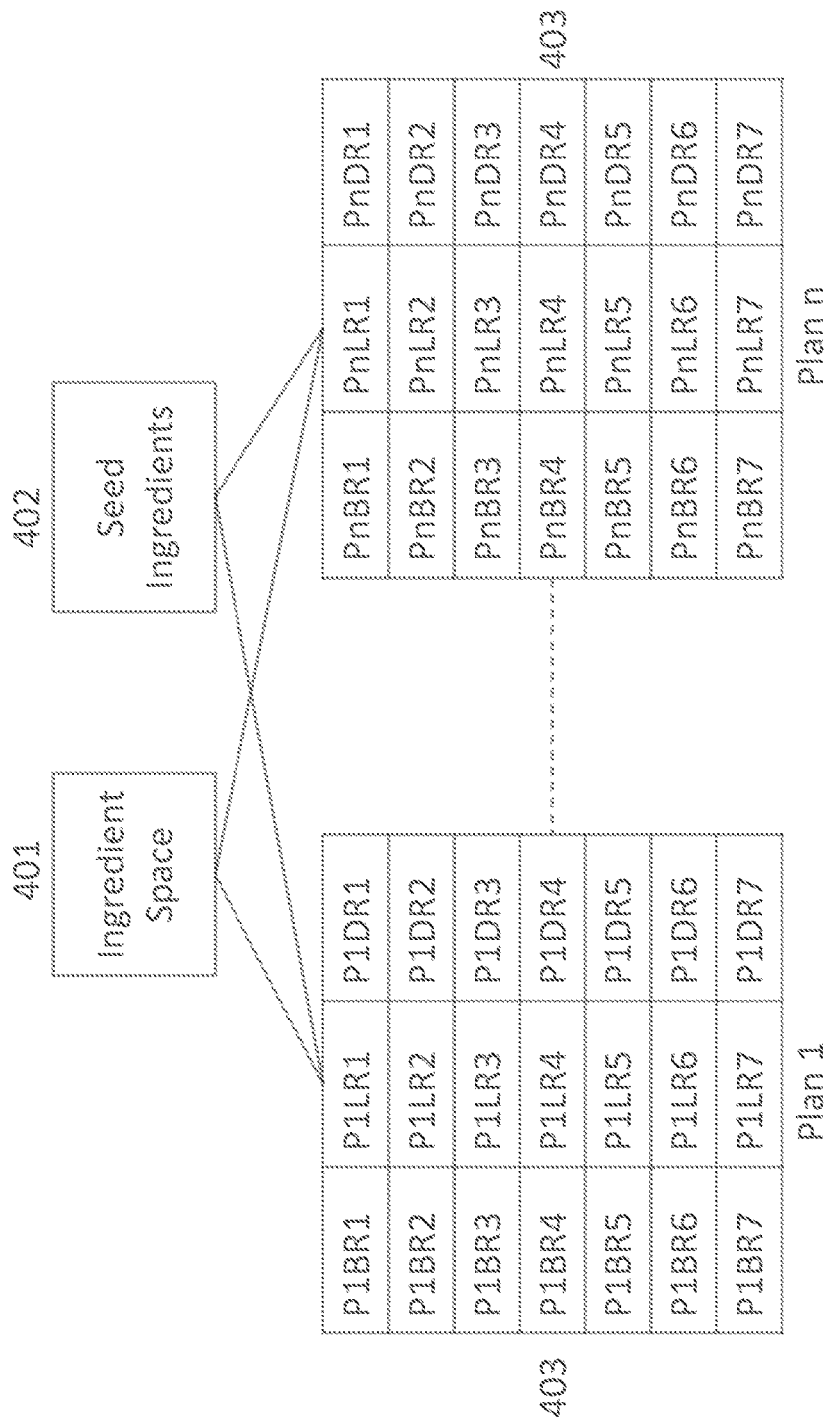
FIG. 4 illustrates the creation of first generation parent meal plans for use in a genetic algorithm as part of the meal planning system depicted in FIG. 1.

After the meal plan template setup operation 102, the meal planning system 100 can proceed to the creation of a first generation of parent meal plans 103. FIG. 4 illustrates the creation of first generation parent meal plans for use in a genetic algorithm as part of the meal planning system 100 depicted in FIG. 1. Using the designations of the ingredient space 401 and the seed ingredients 402 created in operation 101, the system 100 can generate a plurality of first generation parent meal plans 403. The number of first generation meal plans can be adjusted to improve fitness and variety. The number of recipes included in the meal plans 402 can equal the number of bins multiplied by the number of sections or can be a pre-determined number. As shown in the example in FIG. 4, for a meal plan template 300 originally designating three meals for each day of the week, each first generation parent meal plan contains twenty one recipes. Each space in the meal plan (e.g., P1BR1, P1LR1, P1DR1, etc.) can be assigned a complete recipe. The generation of the first generation parent meal plans 403 can be based on a random assignment of recipes that fit the criteria established by the ingredient space 401 and the seed ingredients 402. The recipes can be obtained through user input, from a recipe database, from the Internet, or can be created by the cognitive system.

Figure 5:
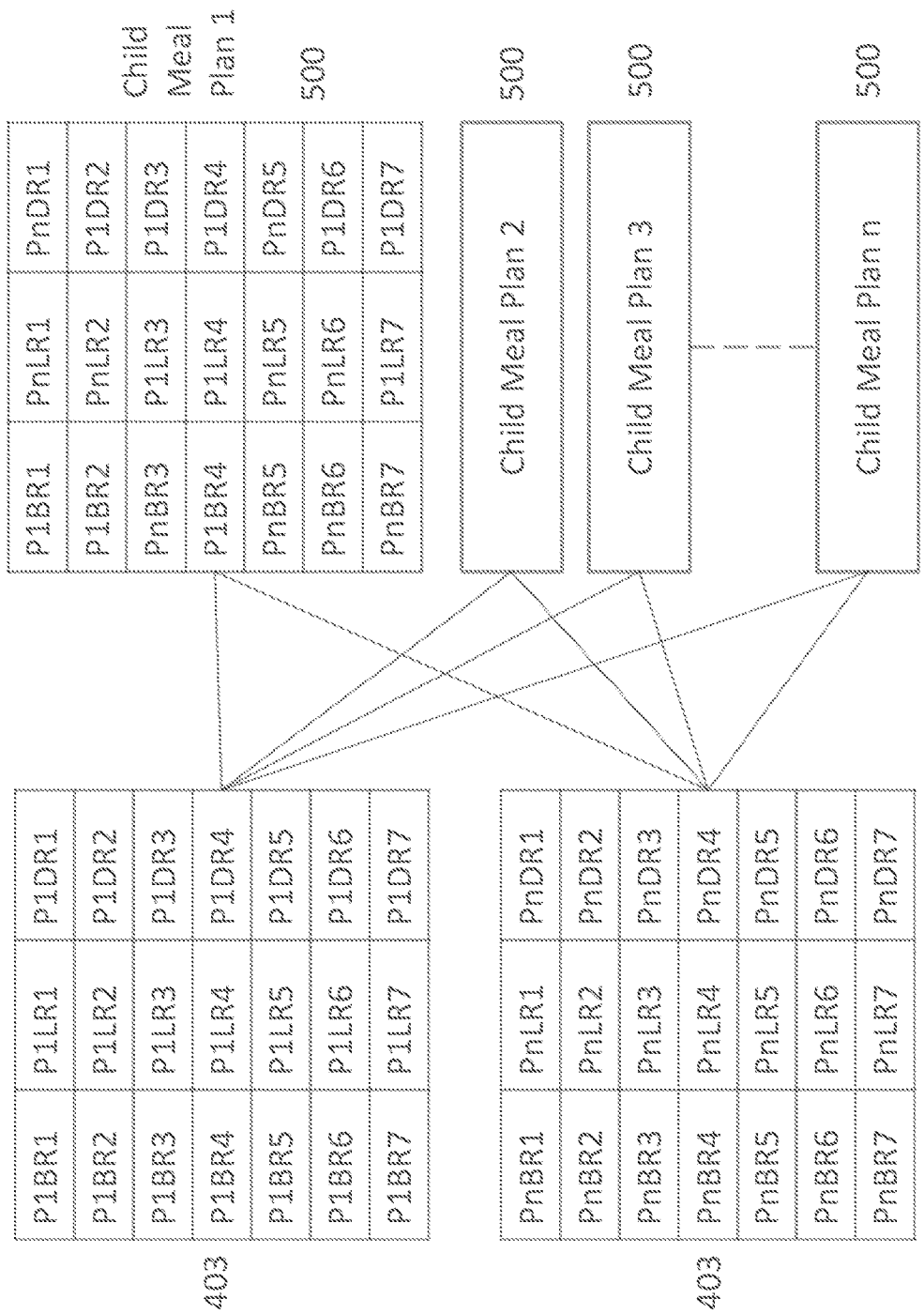
FIG. 5 illustrates the creation of child meal plans for analysis by the genetic algorithm as part of the meal planning system depicted in FIG. 1.

Once the first generation operation 103 completes, the system 100 can proceed to an operation which optimizes the generations using a genetic algorithm 104. First, the parent meal plans 403 can be crossed to form child meal plans 500. FIG. 5 illustrates the creation of child meal plans 500 for analysis by the genetic algorithm as part of the meal planning system 100 depicted in FIG. 1. In an embodiment, two of the plurality of parent meal plans 403 are selected for combination into one or more child meal plans 500. The parent meal plans 403 can originate either from the first generation of parent meal plans created in operation 103, or can be repurposed child meal plans that have survived after the fitness function 600 has analyzed their performance in operations 105 and 106.

The combination of the parent meal plans 403 into the one or more child meal plans 500 can be accomplished through a crossover of the parent meal plans 403. A crossover can randomly select features or recipes from each parent meal plan 403 to create the new child meal plan. An example of a random crossover of parent meal plans 403 is shown as child meal plan 1 in FIG. 5. The random crossover can be constrained to only randomly combine recipes contained in the same section (e.g., breakfast recipes are randomly crossed only with other breakfast recipes). Alternatively, the random crossover can ignore section delineations (e.g., a breakfast section can have a dinner section recipe from either parent meal plan 403 substituted in the crossover). As the number of potential crossovers of the parent meal plans 403 is essentially limitless, the system 100 can generate a sufficient number of child meal plans 500 in order to improve fitness or variety after the child meal plans 500 have been analyzed using the genetic algorithm, or can generate a number of child meal plans 500 that has been pre-determined during the initial setup of the meal planning system 100.

In an embodiment, the system 100 can introduce small mutations in the elements of the child meal plans 500 in order to explore characteristics within the entire plan space more efficiently. Mutations can include altering an ingredient in a particular recipe included in the child meal plan 500, substituting a recipe for another recipe, or by altering the amount of ingredients in a particular recipe due to a waste analysis from the fitness function 600. The mutations can occur randomly during the creation of the child meal plans 500, or can be strategically inserted by the cognitive system.

Figure 6:
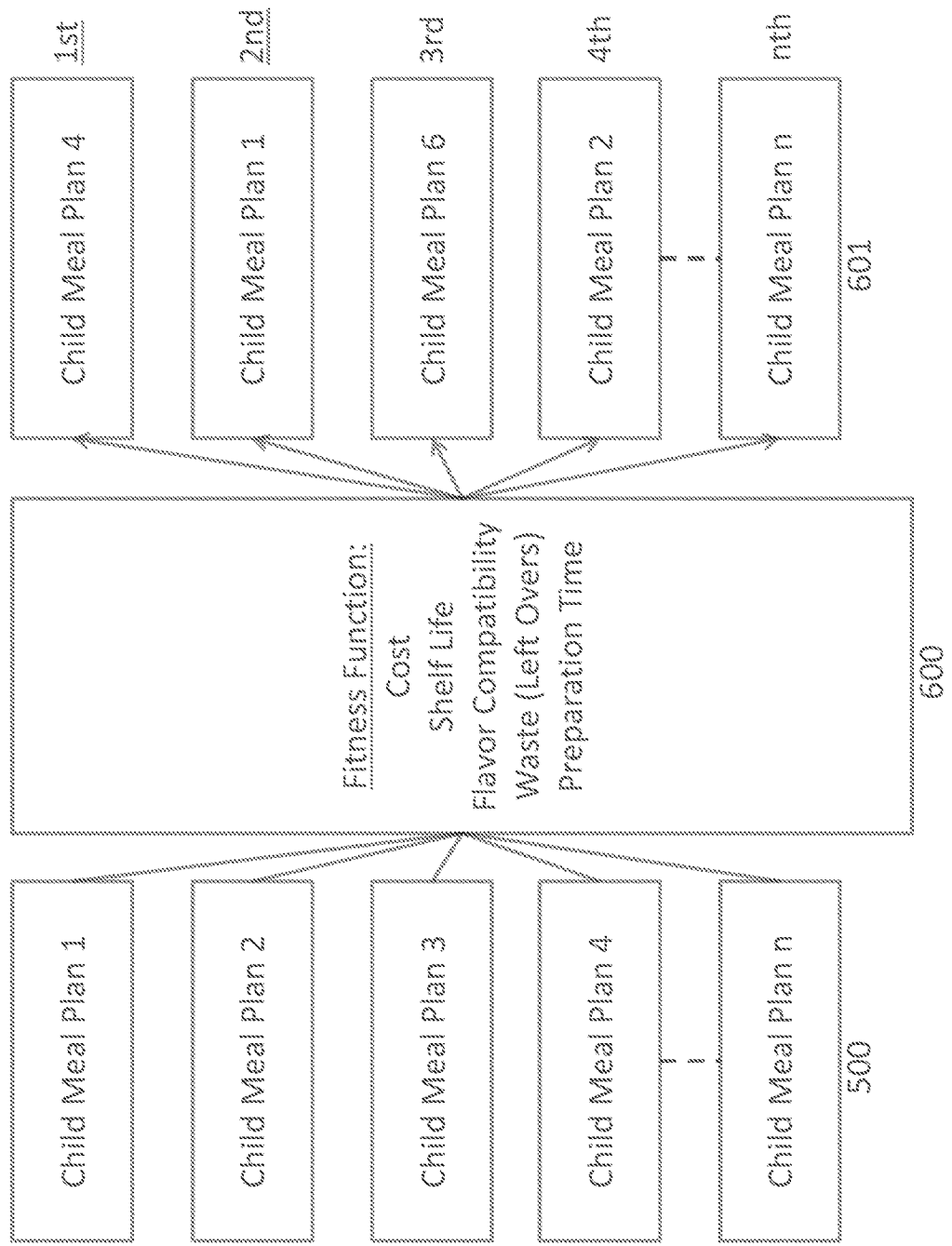
FIG. 6. is a block diagram illustrating the scoring of each child meal plan through the use of the genetic algorithm as part of the meal planning system depicted in FIG. 1.

Once the desired number of child meal plans 500 has been generated, the system 100 can analyze the child meal plans 500 using a genetic algorithm in operation 105. FIG. 6. is a block diagram illustrating the scoring of each child meal plan 500 through the use of the genetic algorithm as part of the meal planning system 100 depicted in FIG. 1. In an embodiment, the genetic algorithm can be a fitness function 600. Alternative embodiments can utilize a general hill-climbing strategy known in the art. The fitness function 600 can take into consideration a list of criteria including, but not limited to, cost, shelf life of ingredients, flavor compatibility of ingredients, waste (in the form of left over amounts of ingredients), and preparation time. A cognitive system, such as Chef Watson™, can auto-generate recipes based on the flavor compatibility of ingredients, which can be incorporated into one or more of the parent meal plans 403. In an embodiment, the fitness function 600 can weigh cost with respect to flavor compatibility, thus enabling the meal planning system 100 to loosen a restriction based on flavor compatibility to accommodate less costly ingredient options. Cost information may be acquired through the meal plan system 100 interacting with an inventory database containing ingredient quantity and price information, which can be included within the meal planning system 100 or held through a third-party, such as a grocery store or ingredient wholesaler. Scores based on flavor compatibility can require interaction with a cognitive system that contains flavor compatibility information. Rankings based on ingredient shelf life can require interaction with a cognitive system or database containing information regarding the shelf life of ingredients or the shelf life of a combination of ingredients.

In an embodiment, each child meal plan 500 is analyzed using the fitness function 600. The fitness function 600 analyzes each child meal plan 500 as well as its individual recipe members, and can assign each child meal plan 500 and its individual recipe members a fitness score. After each child meal plan 500 is scored, the system 100 can create a weighted list 601 of the analyzed child meal plans 500. The highest scoring members of the weighted list 601 can then be used as the next generation of parent meal plans 403 in the next cycle of operations 104 and 105. In an embodiment, a threshold can be applied to the scoring system. If a sufficient number of recipes do not meet the threshold, the fitness function can dynamically drop low scoring recipes or meal plans, can regenerate, using the cognitive system, a new set of recipes or meal plans, and then can rerun the fitness function on the newly modified child meal plans 500. This can allow the meal planning system 100 to drop members of a poorly performing plan and replace them with new members.

The fitness function 600 can score recipes or meal plans based upon waste or left over food amounts, and can incorporate that analysis into a generation of meal plans that can utilize the detected waste. For example, if budgetary constraints or a particular store's inventory requires the purchase of five pounds of an ingredient, but a particular recipe only requires four pounds of the ingredient, the fitness function will detect that there exists a discrepancy of one pound of ingredient, which can be considered waste, and which will subsequently return a lower score on the fitness function. The wasted one pound of ingredient can be cached by the meal planning system 100 as a waste or leftover ingredient, which can then be mutated into other recipes during the child meal plan generation operation 104. The recipe generation using waste ingredients can be accomplished through the use of a cognitive system, such as Chef Watson™. Recipes and meal plans that generate useful waste (e.g., waste that can be repurposed into other recipes) can receive a scoring boost during analysis by the fitness function 600, along with the recipes or meal plans that can utilize the useful waste. The scoring boost can allow for an optimal chance that the entire amount of an ingredient that would otherwise be wasted will eventually entirely be used. If a large amount of waste ingredients are cached after one or more fitness analyses, the meal planning system 100, through the cognitive system, can create an entire recipe using all the wasted ingredients for later incorporation into a parent meal plan 403.

The fitness function 600 can score recipes and meal plans based upon the optimal cost of ingredients, and can boost the score of recipes and meal plans that utilize ingredients that can be purchased in bulk. To obtain cost information, the meal planning system 100 can communicate with a database containing ingredient cost information, which can be held by a third-party entity such as a grocery store or ingredient wholesaler.

The operations of creating child meal plans 104 and analyzing the child meal plans using the genetic algorithm 105 can be iteratively repeated. The amount of repetitions can be based on a standard genetic algorithm tuning parameter. Once the final iteration of operations 104 and 105 has occurred, the meal planning system 100 can populate a candidate meal plan 106 from the final highest scoring child meal plan 500. The candidate meal plan 106 can be left as is or the recipes contained in the candidate meal plan 106 can be reorganized in consideration of ingredient shelf life. For example, in a case where an ingredient has a two day shelf life, the candidate meal plan can be rearranged to ensure that the recipe or recipes using that particular ingredient are placed in the first two bins, ensuring the ingredient is used before its expiration date. In another embodiment, the meal planning system 100 can extract reusable preparation steps from the candidate meal plan to save the user preparation time. For example, if multiple recipes in the candidate meal plan require a minced or chopped ingredient, the meal planning system 100 can suggest that the total amount of the ingredient to be minced or chopped be minced or chopped during the preparation of the first recipe to use that ingredient.

Figure 7:
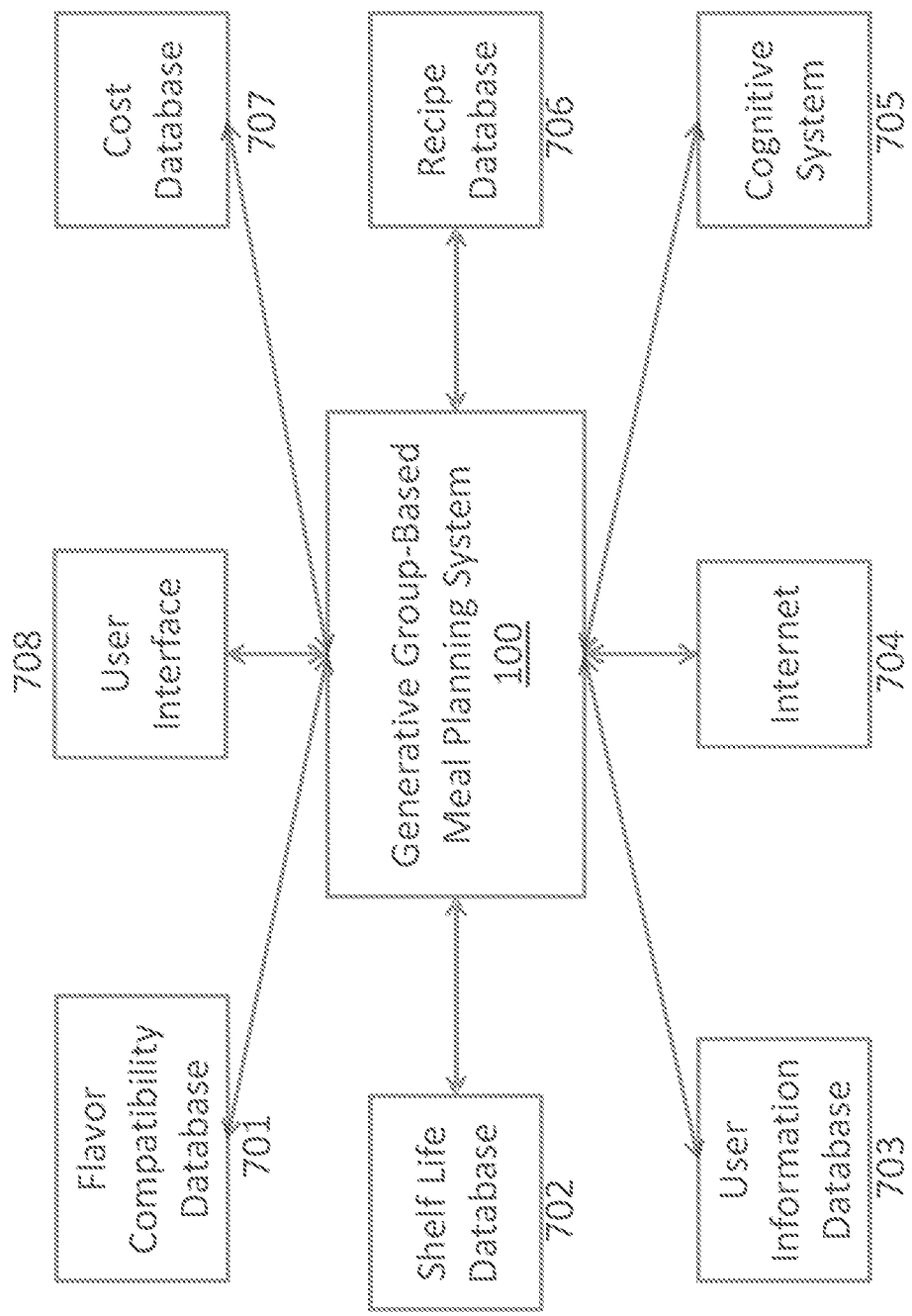
FIG. 7 depicts an example schematic diagram of the meal planning system as depicted in FIG. 1 and its related components.

FIG. 7 depicts an example schematic diagram of the meal planning system 100 and its related components. In an embodiment, the meal planning system 100 can share data with a variety of sources to produce optimal candidate meal plans 106. In scoring the recipes and meal plans through the fitness function 600, the meal planning system 100 can draw information as needed from a flavor compatibility information database 701, a shelf life information database 702, and/or a cost information database 707. Each informational database can be its own separate database, or multiple databases can be combined into a single database. Likewise, when forming the first generation parent meal plans 403, the meal planning system can gather recipes from the Internet 704, from a recipe database 706, or from recipes generated using the cognitive system 705, such as Chef Watson™. When forming the plan setup, the meal planning system can utilize information provided from the user through a user interface 708, which can be a mobile device, personal computer, or graphical user interface. The meal planning system 100 can incorporate prior user choices and inputs, which can be stored in a user information database 703.

Figure 8:
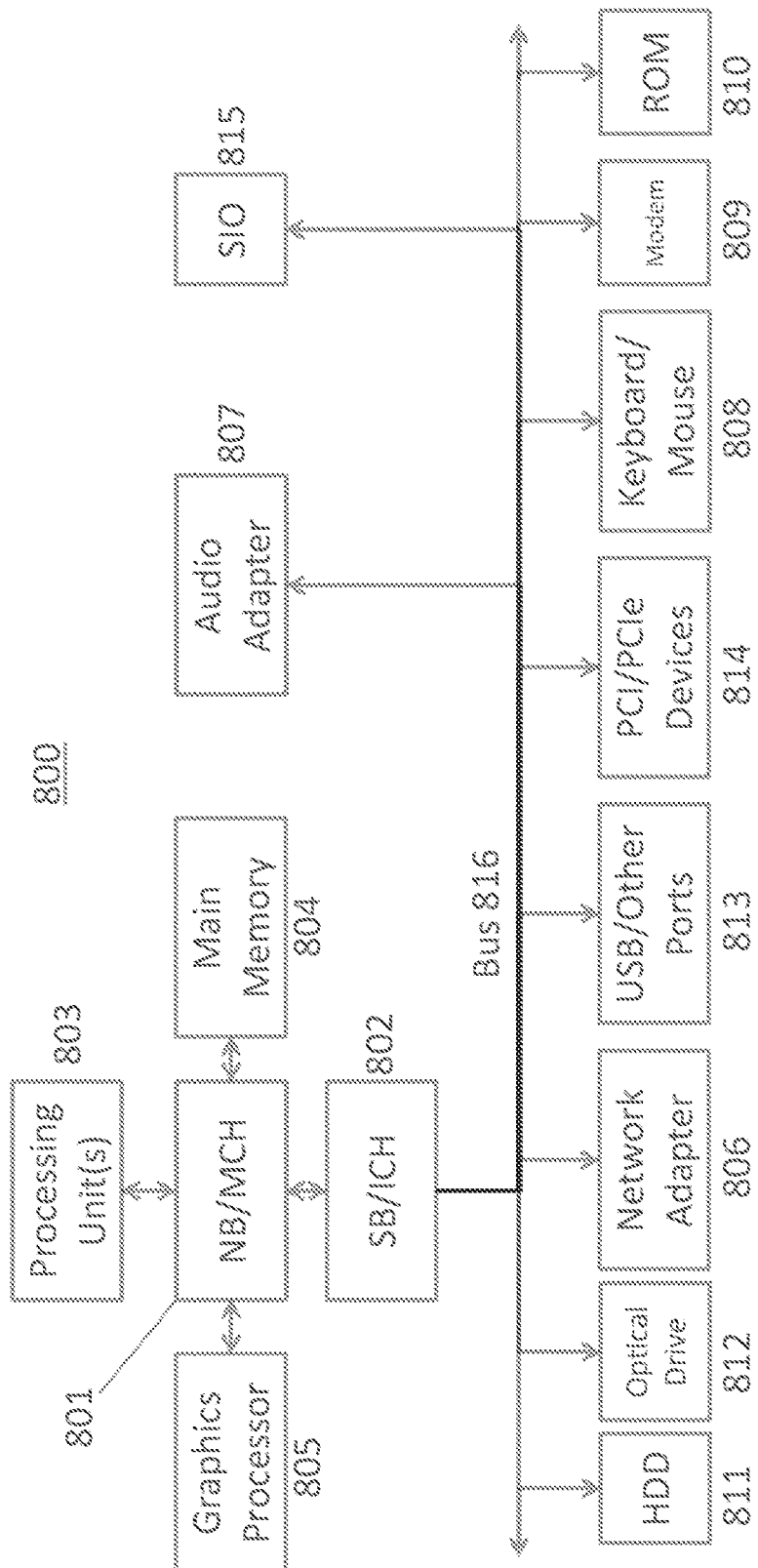
FIG. 8 is a block diagram of an example data processing system 800 in which aspects of the illustrative embodiment of the meal planning system are implemented.

FIG. 8 is a block diagram of an example data processing system 800 in which aspects of the illustrative embodiments are implemented. Data processing system 800 is an example of a computer, such as a server or client, in which computer usable code or instructions implementing the process for illustrative embodiments of the present invention are located. In one embodiment, FIG. 8 represents a server computing device, such as a server, which implements the meal planning system 100 and cognitive system 705 described herein.

In the depicted example, data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH through an accelerated graphics port (AGP).

In the depicted example, the network adapter 806 connects to the SB/ICH 802. The audio adapter 807, keyboard and mouse adapter 808, modem 809, read only memory (ROM) 810, hard disk drive (HDD) 811, optical drive (CD or DVD) 812, universal serial bus (USB) ports and other communication ports 813, and the PCI/PCIe devices 814 can connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. The super I/O (SIO) device 815 can be connected to the SB/ICH.

An operating system can run on processing unit 803. The operating system can coordinate and provide control of carious components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System P® running the Advanced Interactive Executive operating system or the Linux operating system. The data processing system 800 can be a symmetric multiprocessor (SMP) system that can include a plurality of processors in the processing unit 803. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for embodiments of the meal planning system 100 can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or network adapter 806 can include one or more devices that can be used to transmit and receive data.

Those of ordinary skill in the art will appreciate that the hardware depicted in FIG. 8 may vary depending on the implementation. Other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions which are executed by the processor to cause the processor to implement a generative group-based meal planning system comprising a cognitive system having natural language processing capabilities, the method comprising:

receiving, by the meal planning system, a request to generate a candidate meal plan, wherein a seed list including one or more ingredients is designated by the cognitive system based on dish classifications, categories of ingredients, and cuisine classifications; wherein the one or more ingredients included in the seed list are incorporated into one or more recipes contained in the candidate meal plan, wherein the number of needed recipes to be included in the candidate meal plan is pre-determined;

importing, by the meal planning system, one or more recipes incorporating the one or more identified ingredients;

generating, by the cognitive system, one or more parent meal plans, each parent meal plan containing the pre-determined number of recipes, wherein the parent meal plan recipes are randomly selected from the imported recipes incorporating the one or more identified ingredients;

generating, by the meal planning system, one or more child meal plans, wherein each child meal plan is generated by randomly selecting different parent meal plan recipes and combining the selected parent meal plan recipes; wherein one or more mutations are strategically inserted by the cognitive system into the one or more child meal plans;

determining, by the meal planning system, a fitness score for the one or more child meal plans through the utilization of a genetic algorithm, wherein the genetic algorithm comprises a fitness function that considers cost of ingredients, shelf life of ingredients, flavor compatibility of ingredients, waste ingredients, and preparation time as factors in determining the fitness score, wherein the cognitive system generates an additional recipe using all the waste ingredients, and the additional recipe is incorporated into the one or more parent meal plans;

wherein the steps of generating one or more parent meal plans, generating one or more child meal plans, and determining the fitness score for the one or more child meal plans are repeated for a pre-determined and finite number of iterations, wherein the one or more child meal plans with the highest fitness scores are used as the next generation of one or more parent meal plans; and outputting, by the meal planning system, the candidate meal plan having the pre-determined number of recipes, wherein the child meal plan having the highest fitness score is selected to be the candidate meal plan.

2. The method as recited in claim 1, wherein in addition to identifying one or more ingredients to be incorporated, one or more ingredients to be excluded from the one or more recipes contained in the candidate meal plan are further identified.

3. The method as recited in claim 1, wherein the meal planning system is connected to a database containing cost of ingredient information.

4. The method as recited in claim 1, wherein the meal planning system is connected to a database containing shelf life of ingredient information.

5. The method as recited in claim 1, wherein the meal planning system is connected to a database containing flavor compatibility of ingredient information.

6. The method as recited in claim 1, further comprising:

caching, through the meal planning system, waste ingredients in one or more recipes identified during the determination of the fitness score;

creating, through the cognitive system, one or more new recipes based upon the waste ingredients cached; and incorporating, by the meal planning system, the one or more new recipes based upon the waste ingredients into the next generation of one or more parent meal plans.

7. The method as recited in claim 1, further comprising:

identifying, through the cognitive system, one or more identified ingredients as having flavor compatibility;

creating, through the cognitive system, one or more new recipes based upon the compatible ingredients; and incorporating, by the meal planning system, the one or more new recipes based upon the compatible ingredients into the first or next generation of one or more parent meal plans.

8. The method as recited in claim 7, wherein the fitness function is configured to award greater weight to recipes having greater cost efficiency of ingredients, thereby causing the cognitive system to create the one or more new recipes prioritizing cost of ingredients over flavor compatibility.

9. The method as recited in claim 1, further comprising the step of:
verifying the one or more recipes in the candidate meal plan against shelf life of ingredient information.

10. The method as recited in claim 9, further comprising the step of:
reorganizing the one or more recipes in the candidate meal plan to maximize the shelf life of the ingredients.

11. A non-transitory computer readable storage medium having program instructions embodied therewith, the program instructions executable by a processor to cause the processor to:
receive a request to generate a candidate meal plan, wherein a seed list including one or more ingredients is designated by a cognitive system based on dish classifications, categories of ingredients, and cuisine classifications, wherein the one or more ingredients included in the seed list are incorporated into one or more recipes contained in the candidate meal plan, wherein the number of needed recipes to be included in the candidate meal plan is pre-determined;
import one or more recipes incorporating the one or more identified ingredients;
generate, by the cognitive system, one or more parent meal plans each parent meal plan containing the pre-determined number of recipes, wherein the parent meal plan recipes are randomly selected from the identified recipes incorporating the one or more imported ingredients;
generate one or more child meal plans, wherein each child meal plan is generated by randomly selecting different parent meal plan recipes and combining the selected parent meal plan recipes; wherein one or more mutations are strategically inserted by the cognitive system into the one or more child meal plans;
determine a fitness score for the one or more child meal plans through the utilization of a genetic algorithm, wherein the genetic algorithm comprises a fitness function that considers cost of ingredients, shelf life of ingredients, flavor compatibility of ingredients, waste ingredients, and preparation time as factors in determining the fitness score; wherein the cognitive system generates an additional recipe using all the waste ingredients, and the additional recipe is incorporated into the one or more parent meal plans; and
output the candidate meal plan having the chosen number of recipes, wherein the child meal plan having the highest fitness score is selected to be the candidate meal plan;
wherein generating one or more parent meal plans, generating one or more child meal plans, and determining the fitness score for the one or more child meal plans are repeated for a pre-determined and finite number of iterations, wherein the one or more child meal plans with the highest fitness scores are used as the next generation of one or more parent meal plans.

12. The computer readable storage medium as recited in claim 11, wherein the processor is further configured to identify one or more ingredients to be excluded from the one or more recipes contained in the candidate meal plan.

13. The computer readable storage medium as recited in claim 11, wherein the processor is connected to a database containing flavor compatibility of ingredient information.

14. The computer readable storage medium as recited in claim 11, wherein the cognitive system has natural language processing capabilities.

15. The computer readable storage medium as recited in claim 14, wherein the processor is configured to cache waste ingredients in one or more recipes identified during the determination of the fitness score;
the cognitive system is configured to create one or more new recipes based upon the waste ingredients cached; and
the processor is further configured to incorporate the one or more new recipes based upon the waste ingredients into the next generation of one or more parent meal plans.

16. The computer readable storage medium as recited in claim 14,
wherein
the cognitive system is configured to:
identify one or more identified ingredients as having flavor compatibility; and
create one or more new recipes based upon the compatible ingredients; and
the processor is further configured to incorporate the one or more new recipes based upon the compatible ingredients into the first or next generation of one or more parent meal plans.

17. A system for generative group-based meal planning, comprising:
a cognitive system having natural language processing capabilities;
a meal planning processor configured to:
receive a request to generate a candidate meal plan, wherein a seed list including one or more ingredients is designated by the cognitive system based on dish classifications, categories of ingredients, and cuisine classifications, wherein the one or more ingredients included in the seed list are incorporated into one or more recipes contained in the candidate meal plan, wherein the number of needed recipes to be included in the candidate meal plan is pre-determined;
import one or more recipes incorporating the one or more identified ingredients;
generate, by the cognitive system, one or more parent meal plans, each parent meal plan containing the pre-determined number of recipes, wherein the parent meal plan recipes are randomly selected from the identified recipes incorporating the one or more imported ingredients;
generate one or more child meal plans, wherein each child meal plan is generated by randomly selecting different parent meal plan recipes and combining the selected parent meal plan recipes; wherein one or more mutations are strategically inserted by the cognitive system into the one or more child meal plans;
determine a fitness score for the one or more child meal plans through the utilization of a genetic algorithm, wherein the genetic algorithm comprises a fitness function that considers cost of ingredients, shelf life of ingredients, flavor compatibility of ingredients, waste ingredients, and preparation time as factors in determining the fitness score; wherein the cognitive system generates an additional recipe using all the waste ingredients, and the additional recipe is incorporated into the one or more parent meal plans; and output the candidate meal plan having the chosen number of recipes, wherein the child meal plan having the highest fitness score is selected to be the candidate meal plan;

wherein generating one or more parent meal plans, generating one or more child meal plans, and determining the fitness score for the one or more child meal plans are repeated for a pre-determined and finite number of iterations, wherein the one or more child meal plans with the highest fitness scores are used as the next generation of one or more parent meal plans.

18. The method as recited in claim 1, wherein the one or more mutations comprise one or more of: altering an ingredient in a particular recipe included in the one or more child meal plans, substituting a first recipe for a second recipe, and altering the amount of ingredients in the particular recipe due to a waste analysis from the fitness function.

19. The computer readable storage medium as recited in claim 11, wherein the one or more mutations comprise one or more of: altering an ingredient in a particular recipe included in the one or more child meal plans, substituting a first recipe for a second recipe, and altering the amount of ingredients in the particular recipe due to a waste analysis from the fitness function.

* * * * *